US012615209B2

(12) United States Patent
Weng et al.

(10) Patent No.: US 12,615,209 B2
(45) Date of Patent: Apr. 28, 2026

(54) INTER-CHIPLET ROUTING OF TRANSACTIONS ACROSS MULTI-HETEROGENEOUS CHIPLETS USING HIERARCHICAL ADDRESSING

(71) Applicant: Intel Corporation, Santa Clara, CA (US)

(72) Inventors: Lichen Weng, San Jose, CA (US); Ramadass Nagarajan, Portland, OR (US); Anand Jayaraman, Sunnyvale, CA (US); Vijeta Prasad, Fremont, CA (US); Justin Reyes, San Jose, CA (US); Gurucharapathy Karthikeyan, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 17/954,430

(22) Filed: Sep. 28, 2022

(65) Prior Publication Data

US 2023/0027585 A1 Jan. 26, 2023

(51) Int. Cl.
| | |
|---|---|
| *H04L 45/745* | (2022.01) |
| *G06F 13/40* | (2006.01) |

(Continued)

(52) U.S. Cl.
CPC ........ *H04L 45/745* (2013.01); *G06F 13/4027* (2013.01); *G06F 13/42* (2013.01); *H04L 45/16* (2013.01); *H04L 49/109* (2013.01)

(58) Field of Classification Search
CPC ..... H04L 45/745; H04L 45/16; H04L 45/109; G06F 13/4027; G06F 13/42
See application file for complete search history.

(56) References Cited

U.S. PATENT DOCUMENTS

| | | | |
|---|---|---|---|
| 5,493,566 A | 2/1996 | Ljungerg et al. | |
| 6,009,488 A | 12/1999 | Kavipurapu | |

(Continued)

FOREIGN PATENT DOCUMENTS

| | | |
|---|---|---|
| CN | 1819555 | 8/2006 |
| CN | 1833415 | 9/2006 |

(Continued)

OTHER PUBLICATIONS

Everton Carara, et al., "Communication Models in Networks-on-Chip," 18th IEEE/IFIP International Workshop on Rapid System Prototyping (RSP '07), 2007, pp. 57-60.

(Continued)

*Primary Examiner* — Aurangzeb Hassan
(74) *Attorney, Agent, or Firm* — NICHOLSON DE VOS WEBSTER & ELLIOTT LLP

(57) ABSTRACT

In one embodiment, a first chiplet includes: a plurality of agents to generate messages, each of the messages having a destination port identifier comprising a first portion to identify a destination chiplet and a second portion to identify a destination agent on the destination chiplet; a die-to die bridge to couple the first chiplet to a second chiplet; a fabric coupled to the die-to-die bridge to route communications between the plurality of agents, where a first agent is to generate a first message having a first destination port identifier; and a first fabric adapter coupled to the first agent, the first fabric adapter to direct the first message to the die-to-die bridge when the first portion of the first destination port identifier identifies a second chiplet as the destination chiplet. Other embodiments are described and claimed.

20 Claims, 7 Drawing Sheets

(51) Int. Cl.
| | | |
|---|---|---|
| *G06F 13/42* | (2006.01) | |
| *H04L 45/16* | (2022.01) | |
| *H04L 49/109* | (2022.01) | |

(56) References Cited

U.S. PATENT DOCUMENTS

| | | | |
|---|---|---|---|
| 6,233,632 | B1 | 5/2001 | Meiyappan et al. |
| 6,330,647 | B1 | 12/2001 | Jeddeloh et al. |
| 6,427,169 | B1 | 7/2002 | Elzur |
| 6,430,182 | B1 | 8/2002 | Oyama |
| 6,469,982 | B1 | 10/2002 | Henrion et al. |
| 6,611,893 | B1 | 8/2003 | Lee et al. |
| 6,694,380 | B1 | 2/2004 | Wolrich et al. |
| 6,725,313 | B1 | 4/2004 | Wingard et al. |
| 6,810,460 | B1 | 10/2004 | Kirkwood |
| 6,816,938 | B2 | 11/2004 | Edara et al. |
| 7,065,733 | B2 | 6/2006 | Goodnow et al. |
| 7,415,533 | B1 | 8/2008 | Lacroute et al. |
| 7,421,543 | B2 | 9/2008 | Suzuki |
| 7,457,905 | B2 | 11/2008 | Gehman |
| 7,506,089 | B2 | 3/2009 | Cho et al. |
| 7,573,295 | B1 | 8/2009 | Stadler |
| 7,613,902 | B1 | 11/2009 | Martin et al. |
| 7,673,087 | B1 | 3/2010 | Ansari et al. |
| 7,685,346 | B2 | 3/2010 | Teh |
| 7,723,902 | B2 | 5/2010 | Mandhani et al. |
| 7,734,856 | B2 | 6/2010 | Reinig |
| 7,783,819 | B2 | 8/2010 | Mandhani |
| 7,793,345 | B2 | 9/2010 | Weber et al. |
| 7,873,068 | B2 | 1/2011 | Klinglesmith et al. |
| 7,979,592 | B1 | 7/2011 | Pettey et al. |
| 7,990,999 | B2 | 8/2011 | Lee |
| 8,010,731 | B2 | 8/2011 | Mandhani |
| 8,023,508 | B2 | 9/2011 | Horton |
| 8,069,286 | B1 | 11/2011 | Orthner et al. |
| 8,199,157 | B2 | 6/2012 | Park et al. |
| 8,225,019 | B2 | 7/2012 | Asnaashari |
| 8,286,014 | B2 | 10/2012 | Han et al. |
| 8,364,874 | B1 | 1/2013 | Schlansker et al. |
| 8,437,369 | B2 | 5/2013 | Shaikli |
| 8,443,422 | B2 | 5/2013 | Weber et al. |
| 8,711,875 | B2 | 4/2014 | Lakshmanamurthy |
| 8,713,234 | B2 | 4/2014 | Lakshmanamurthy |
| 8,713,240 | B2 | 4/2014 | Lakshmanamurthy |
| 8,775,700 | B2 | 7/2014 | Lakshmanamurthy |
| 8,805,926 | B2 | 8/2014 | Lakshmanamurthy |
| 8,874,976 | B2 | 10/2014 | Lakshmanamurthy |
| 8,929,373 | B2 | 1/2015 | Lakshmanamurthy |
| 8,930,602 | B2 | 1/2015 | Lakshmanamurthy |
| 9,021,156 | B2 | 4/2015 | Lakshmanamurthy |
| 9,053,251 | B2 | 6/2015 | Lakshmanamurthy |
| 10,911,261 | B2 | 2/2021 | Adler et al. |
| 2002/0038401 | A1 | 3/2002 | Zaidi |
| 2003/0088722 | A1 | 5/2003 | Price |
| 2003/0126336 | A1 | 7/2003 | Creta |
| 2003/0227926 | A1 | 12/2003 | Ramamurthy et al. |
| 2004/0177176 | A1 | 9/2004 | Li et al. |
| 2004/0218600 | A1 | 11/2004 | Mehdi et al. |
| 2005/0010687 | A1 | 1/2005 | Dai |
| 2005/0120323 | A1 | 6/2005 | Goodnow et al. |
| 2005/0137966 | A1 | 6/2005 | Munguia et al. |
| 2005/0177664 | A1 | 8/2005 | Cho et al. |
| 2005/0289369 | A1 | 12/2005 | Chung et al. |
| 2005/0289374 | A1 | 12/2005 | Kim et al. |
| 2006/0047849 | A1 | 3/2006 | Mukherjee |
| 2006/0101179 | A1 | 5/2006 | Lee et al. |
| 2006/0140126 | A1 | 6/2006 | Zhong |
| 2006/0218336 | A1 | 9/2006 | Ishizawa et al. |
| 2007/0006108 | A1 | 1/2007 | Bueti |
| 2007/0067549 | A1 | 3/2007 | Gehman |
| 2008/0059441 | A1 | 3/2008 | Gaug et al. |
| 2008/0082840 | A1 | 4/2008 | Kendall et al. |
| 2008/0163005 | A1 | 7/2008 | Sonksen et al. |
| 2008/0235415 | A1 | 9/2008 | Clark et al. |
| 2008/0288689 | A1 | 11/2008 | Hoang et al. |

| | | | | |
|---|---|---|---|---|
| 2008/0310458 | A1 | 12/2008 | Rijpkema | |
| 2009/0006165 | A1 | 1/2009 | Teh et al. | |
| 2009/0119432 | A1 | 5/2009 | Lee et al. | |
| 2009/0235099 | A1 | 9/2009 | Branover et al. | |
| 2009/0248940 | A1 | 10/2009 | Marino et al. | |
| 2009/0249098 | A1 | 10/2009 | Han et al. | |
| 2009/0296624 | A1 | 12/2009 | Ryu et al. | |
| 2009/0296740 | A1 | 12/2009 | Wagh | |
| 2009/0300245 | A1 | 12/2009 | Shoemaker et al. | |
| 2009/0310616 | A1 | 12/2009 | Cummings et al. | |
| 2010/0022070 | A1 | 1/2010 | Imahayashi | |
| 2010/0199010 | A1 | 8/2010 | Goren et al. | |
| 2010/0220703 | A1 | 9/2010 | Farrugia et al. | |
| 2010/0235675 | A1 | 9/2010 | Subramanian et al. | |
| 2010/0246594 | A1 | 9/2010 | Klinglesmith et al. | |
| 2010/0262855 | A1 | 10/2010 | Buch et al. | |
| 2010/0293304 | A1 | 11/2010 | Alexandron et al. | |
| 2010/0312942 | A1 | 12/2010 | Blinick et al. | |
| 2011/0032947 | A1 | 2/2011 | Brueggen | |
| 2011/0047272 | A1 | 2/2011 | Bosneag | |
| 2011/0078315 | A1 | 3/2011 | Matsushita et al. | |
| 2011/0078356 | A1 | 3/2011 | Shoemaker | |
| 2011/0093576 | A1 | 4/2011 | Cherian et al. | |
| 2011/0179248 | A1 | 7/2011 | Lee | |
| 2011/0238728 | A1 | 9/2011 | Nagarajao et al. | |
| 2012/0051297 | A1 | 3/2012 | Lee et al. | |
| 2012/0066468 | A1 | 3/2012 | Nakajima et al. | |
| 2012/0079590 | A1 | 3/2012 | Sastry et al. | |
| 2012/0233514 | A1 | 9/2012 | Patil et al. | |
| 2012/0303842 | A1 | 11/2012 | Cardinell et al. | |
| 2012/0303899 | A1 | 11/2012 | Ash et al. | |
| 2012/0311213 | A1 | 12/2012 | Bender et al. | |
| 2013/0054845 | A1 | 2/2013 | Nimmala et al. | |
| 2013/0089095 | A1 | 4/2013 | Chen et al. | |
| 2013/0166659 | A1* | 6/2013 | Champel | H04L 12/1881 |
| | | | | 709/206 |
| 2014/0229709 | A1* | 8/2014 | Kuesel | G06F 9/3009 |
| | | | | 712/36 |
| 2014/0359044 | A1 | 12/2014 | Davis | |
| 2015/0019788 | A1 | 1/2015 | Adler et al. | |
| 2015/0222452 | A1 | 8/2015 | Ng | |
| 2015/0222533 | A1 | 8/2015 | Birrittella | |
| 2016/0034411 | A1 | 2/2016 | Smith | |
| 2016/0140070 | A1 | 5/2016 | Araujo | |
| 2019/0363717 | A1* | 11/2019 | Swarbrick | G06F 21/85 |
| 2020/0228356 | A1* | 7/2020 | Meng | H04L 12/18 |
| 2020/0294180 | A1* | 9/2020 | Koker | G06T 1/20 |
| 2021/0326489 | A1* | 10/2021 | Kee | G06F 13/1684 |
| 2022/0222194 | A1* | 7/2022 | Chandwani | G06F 13/1663 |
| 2025/0379933 | A1* | 12/2025 | Rathod | H04M 1/72469 |

FOREIGN PATENT DOCUMENTS

| | | |
|---|---|---|
| CN | 101558589 | 10/2009 |
| CN | 101873339 | 10/2010 |
| EP | 1328104 | 7/2003 |
| EP | 2216722 | 6/2008 |
| GB | 2405052 | 2/2005 |
| JP | 2007135035 | 5/2007 |
| KR | 1020050077437 | 8/2005 |
| KR | 1020050082834 | 8/2005 |
| WO | 0119081 | 3/2001 |
| WO | 3032584 | 4/2003 |
| WO | 2005071553 | 8/2005 |
| WO | 2010102055 | 9/2010 |
| WO | 2010137572 | 12/2010 |

OTHER PUBLICATIONS

Intel Corporation, "An Introduction to the Intel QuickPath Interconnect," Jan. 2009, pp. 1-22.
Mentor Graphics, "PCI Express to AMBA 3, AXI Bridge IP," Mentor Graphics Jun. 2007, 2 pages.
PCI-SIG, "PCI Local Bus Specification, Revision 3.0," Feb. 3, 2004, 3 pages.

(56) References Cited

OTHER PUBLICATIONS

Sousek, et al., "PCI Express Core Integration with the OCP Bus,"
CAST, Inc. 2006, 15 pages.

* cited by examiner

SoC BC Dielet B0 LUT 159

| Dest Die | Action/Route |
|---|---|
| B1 | Route to C |
| C | Route to C |
| Not C or not B1 | Abort |

SoC AB Dielet B1 LUT 129

| Dest Die | Action/Route |
|---|---|
| A0 | Route to A0 |
| A1 | Route to A0 |
| B0 | Route to A0 |
| B1 | Route to local |
| B2 | Route to A0 |
| B3 | Route to A0 |
| Not (A0,A1,B0, B1,B2,B3) | Abort |

INTER-CHIPLET ROUTING OF TRANSACTIONS ACROSS MULTI-HETEROGENEOUS CHIPLETS USING HIERARCHICAL ADDRESSING

BACKGROUND

System on chips (SoCs) are being built in a disaggregated fashion using function-specific chiplets connected in a variety of topology configurations. This presents a challenge for unicast and multicast inter-chiplet communications, as it is desirable for a fabric architecture to be flexible to accommodate late-binding topologies during design and development. Sometimes the same building block chiplet is reused in an another SoC with a different chiplet topology, yet the focus remains on a control or sideband fabric, which typically is inflexible with respect to topology, chiplet composition and routing.

DETAILED DESCRIPTION

Figure 1:
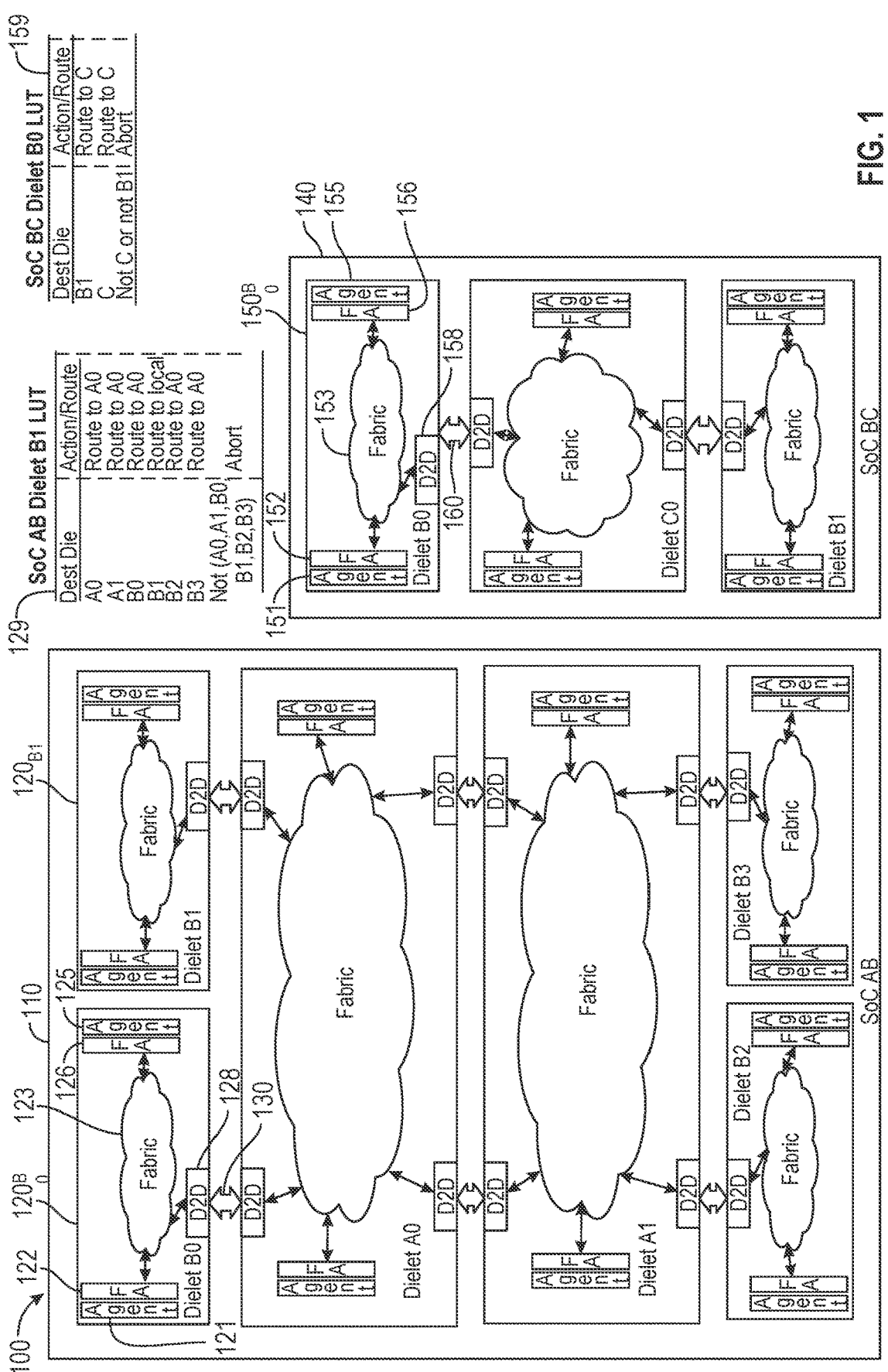
FIG. 1 is a block diagram of a system in accordance with an embodiment.

In various embodiments, a hierarchical message addressing technique is implemented in which a port identifier (Port ID) having a hierarchical arrangement is used for communicating and routing messages. More specifically in one or more embodiments, an SoC or other processor can be configured to generate and handle messages having a Port ID with multiple fields including a first field to identify a target chiplet for a message and a second field to identify a destination agent within the target chiplet. In a particular embodiment, the first field may be populated with upper bits of the Port ID (also referred to as a Die ID) to identify the target chiplet and the second field may be populated with lower bits of the Port ID (also referred to as a local Port ID) to identify a particular destination agent within the target chiplet. While one or more implementations described herein utilize Port IDs having 2 fields, embodiments are not so limited and in other cases more than 2 fields may be provided to enable greater granularity in addressing and routing messages to more granular components within a chiplet or other circuit.

When designing an SoC or other multi-die package having multiple chiplets, a topology does not need to be decided upfront, enhancing flexibility. Instead, during a design process addition/deletion of chiplets in a topology can be done by programing a lookup table (LUT) in each chiplet, when it is decided to incorporate the chiplet into the package.

As used herein, the terms "chiplet" and "dielet" are used interchangeably to refer to independent semiconductor dies having circuitry, where the dies can be incorporated into a multi-die package. In one or more embodiments, each chiplet of an SoC or other processor may include one or more local fabrics that are interconnected through die-to-die (D2D) bridges, allowing for the configurable inter-chiplet routing of messages. Inter-chiplet multicast support in each chiplet can be designed for a maximum number of chiplets, multicast groups and hops.

In addition, each chiplet also may include one or more D2D bridges that host or control access to a configurable routing table/LUT. In one or more embodiments, this table may be implemented as a die-based table. Using this table, a die can forward a message based on a destination die ID lookup on the LUT. In general, a given chiplet can, with respect to a message, perform one or more of: consume the message; abort the message due to an invalid Die ID; or forward to a next hop chiplet.

In one or more embodiments, fabric agents (also referred to as "fabric adapters") can replicate multicast requests for local chiplets and send one each for a maximum number of chiplets. Die-to-die bridges at target chiplets can replicate the multicast requests as required. With embodiments, an interconnect between the chiplets can be protocol agnostic; that is, inter-chiplet communication can remain agnostic of a heterogenous chiplet configurations. This is so since different variations of heterogenous chiplet configurations can result by implementing configuration changes to LUTs associated with the die-to-die bridges. Using embodiments, a set of chiplets can be reused to create multiple SoCs that support inter-chiplet unicast and multicast transactions. Further, messages between chiplets can be blocked/forwarded via the configuration techniques described herein. Flexibility can be enhanced as a basic input output system (BIOS) or other firmware can use the same local Port ID and a different Die ID to address the same agent across different chiplets using hierarchical addressing techniques as described herein.

Using a hierarchical message addressing technique that uses upper bits of a Port ID to identify a target chiplet and lower bits of the Port ID to identify a destination agent within a chiplet, more efficient fabric binding and use can be realized. With embodiments, each chiplet has one or more local fabrics in which agents can be targeted using the lower bits of the Port ID. The agents in each fabric can reach agents in other chiplets through die-to-die bridges that can be configured to forward, drop, or error handle inter-chiplet messages. The D2D bridge can include or be associated with a table having information used to filter outgoing messages in each chiplet and route to a desired destination. Such messages can accommodate multiple hops, in which case the routing decision is made at each chiplet hop. In certain implementations, a die-to-die bridge can filter messages based on security privilege of the message such as Security Attributes of Initiator (SAI) information and a destination Die ID.

Each agent in a local fabric is connected to a fabric adapter, which decodes the destination Port ID from incoming messages. If the upper segment of the Port ID does not correspond to the local chiplet, the fabric adapter forwards the message to a die-to-die bridge, without needing to know if the target chiplet exists in the current configuration. In case of the upper segment matching the local chiplet, the fabric adapter uses the lower segment of the Port ID to route the message to the destination agent in the same local fabric.

In one or more embodiments, the fabric adapter also includes decoder circuitry to decode multicast group IDs. In the case of a hit, the fabric adapter generates a series of unicast messages to target multicast destinations in the local chiplet, and further sends copies of the multicast message to a predefined number of chiplets through the die-to-die bridge.

Thus in one or more embodiments, a multicast message can be sent to agents in different chiplets based on multicast groups defined in each chiplet. At each target chiplet, the die-to-die bridge uses the multicast group ID and bitmap for that chiplet to match multicast messages meant for the chiplet. Based on such decoding, the die-to-die bridge performs a serial unicast to all targets of the matching multicast group. The list of target agents in the chiplet can be selected based on the hop of the chiplet.

Since each fabric in a chiplet is independent, chiplets can be combined to create multiple configurations. Referring now to FIG. 1, shown is a block diagram of a system in accordance with an embodiment. As shown in FIG. 1, system 100 includes multiple SoCs, namely a first SoC 110 and a second SoC 160. Each SoC is implemented as a multi-package, including heterogeneous chiplets. More particularly, several basic building block chiplets can be differently configured when implemented in the same or different packages. Thus as shown in FIG. 1, SoC 110 includes chiplets, including enumerated chiplets 120 that, while having the same hardware components, can be differently configured to enable late binding of routing information during design and development. While shown with only two SoCs, understand that a given system may include additional components, including additional SoCs or other processors, memories, interface circuitry, mass storage, communication devices and so forth.

Note that in FIG. 1, only several of the dielets are enumerated with additional circuitry for ease of illustration. With reference to SoC 120 B0, a first agent 121 and a second agent 125 are present. In various implementations, these agents may be any type of processing component, such as cores, graphics processors, accelerators or so forth. In turn each agent couples to an associated fabric adapter 122, 126. These fabric adapters may act as an interface between a given agent and additional circuitry, in part via a fabric 123 which handles routing and enables communication with other chiplets. Each chiplet 120 includes at least one D2D bridge to communicate with a D2D bridge in another chiplet via an in-package connect 130. As further illustrated in FIG. 1, each chiplet may have different numbers of D2D agents, fabric adapters and so forth.

While chiplet 150 may be configured with the same hardware as chiplet 120, different programming by way of different lookup tables to accommodate the routing differences in the different SOC's provides great flexibility in reusing these chiplets in different SoC's. Understand while shown at this high level in the embodiment of FIG. 1, many variations and alternatives are possible.

As illustrated, SoC AB is composed of two types of chiplets, i.e., chiplet A and chiplet B. SoC BC is composed of chiplet B and chiplet C. In these two topologies, chiplet B is being reused, in that there are multiple instantiations, included in the same or different package. In FIG. 1, representative dielets 120 B0, B1 and 150 B0 are enumerated; other chiplets may be similarly arranged (of course having different LUTs as described herein).

Each of chiplets A, B and C has a local fabric that addresses agents using the hierarchical addressing described here. More specifically, each agent present in a given chiplet is identified using the lower bits of a Port ID. In turn, the upper bits of the Port ID is used to identify the chiplet for inter-chiplet communication. In various embodiments, the number of upper bits may be selected depending on the maximum number of agents in a chiplet and the maximum number of chiplets that will combine to make an SoC.

With further reference to FIG. 1, SoC AB combines only two chiplets: chiplets A, B. Multiple heterogeneous chiplet configurations can be constructed with two chiplets A and B and the fabrics can still communicate with each other. By way of illustration, representative LUTs 129, 159 are illustrated.

And as illustrated, chiplet B can be reused with a newly designed chiplet C to create a new SoC BC. To this end, the LUT table of chiplet B is configured appropriately in configurations of SoC AB and BC, enabling reuse of chiplet B. The configuration of the LUT in each chiplet can be different and can be visible to the BIOS. In one or more embodiments, LUTs can be reconfigured for debuggability. These LUTs can be configured independently, thus enabling dynamic configuration and debuggability.

Figure 2:
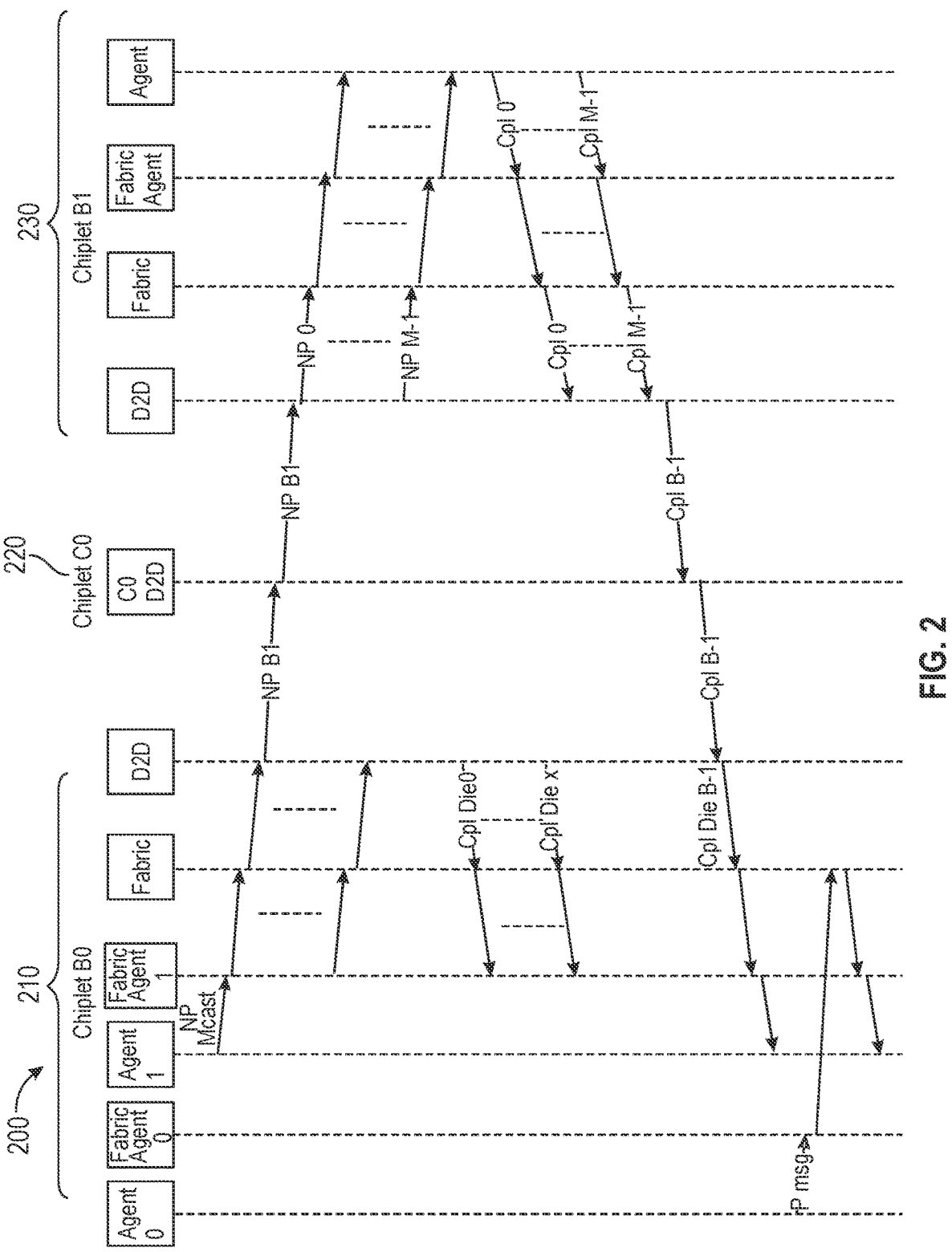
FIG. 2 is an illustration of communication of messages between SoCs in accordance with an embodiment.

Referring now to FIG. 2, shown is an illustration of communication of messages between SoCs in accordance with an embodiment. More specifically, FIG. 2 illustrates a timing diagram 200 of message transaction communications between different SoCs 210, 220 and 230. As illustrated, SoCs 210 and 230 may include various agents, fabric agents and at least one D2D bridge. As shown, the SoCs may perform hierarchical message decoding and routing, using Port IDs constructed in accordance with an embodiment. At a high level, FIG. 2 illustrates two message flows, an inter-chiplet non-posted flow and an intra-chiplet posted message flow.

More specifically, the first transaction illustrated is an inter-chiplet non-posted multicast (NP Mcast) from chiplet B0 to chiplet B1 via chiplet C0. In this flow, an agent (Agent 1) in chiplet B0 does not have to comprehend the chiplet topology, e.g., number of chiplets and multicast groups in each chiplet. Instead the agent generates a single non-posted message that it sends to its associated fabric adapter (Fabric Agent 1). The fabric adapter comprehends the multicast groups supported in the local chiplet and replicates the non-posted message for each target agent in the multicast group. The fabric adapter also sends to a die-to-die bridge one copy of the message for each chiplet (a maximum number of chiplets may be determined by number of bits for the Die ID field in the Port ID). The die-to-die bridge in the source chiplet can be configured to return completions for all non-existent chiplets.

One or more intermediate chiplets (e.g., chiplet C0) route messages according to the Die ID field of the destination port ID in the messages. In the remote destination dielet (chiplet B1), the die-to-die bridge comprehends the supported multicast groups for the chiplet and, similar to the fabric adapter in the source chiplet, replicates the non-posted message for each target agent in the multicast group. Each target agent receiving the non-posted request generates a completion (Cpl) that is decoded by a corresponding fabric adapter. Since the Die ID field in the destination port ID is not local, the fabric adapters route the completions to the die-to-die bridge so that they can be routed to other chiplets.

In one or more embodiments, the completions from the target agents are aggregated by the die-to-die bridge and an aggregated completion is sent back to the source agent of the non-posted request in the source chiplet. The fabric adapter in the source chiplet waits for all completions corresponding to the replicated non-posted requests it transmitted including the messages sent to the chiplets. When all the completions from both local chiplet and remote chiplets arrive, the fabric adapter sends an aggregated response back to the agent. In this way, the agent generating the multicast can remain agnostic to the chiplet configurations and multicast group assignments in the chiplets.

Still referring to FIG. 2, the second transaction illustrated is an intra-chiplet routing of a posted message (Pmsg). More specifically, this flow is for an intra-chiplet posted message between agents in chiplet B0. The source agent forwards the message to the attached fabric adapter. The fabric adapter checks if the destination Port ID is in local chiplet and finds the target using a LUT. The fabric adapter forwards the message to the target agent through the fabric.

In contrast, without an embodiment, an SoC may implement a hierarchical sideband fabric which does not provide substantial configuration in inter-chiplet routing. Thus in this conventional use case, for a multicast all possible source agents and targets are required to be known a priori before building the fabric to allow embedding a multicast routing table in each router. As a result, such conventional inter-chiplet routing is not configurable and requires a priori topology information, preventing chiplets from being modular and reusable across multi-heterogenous chiplet configurations.

Figure 3:
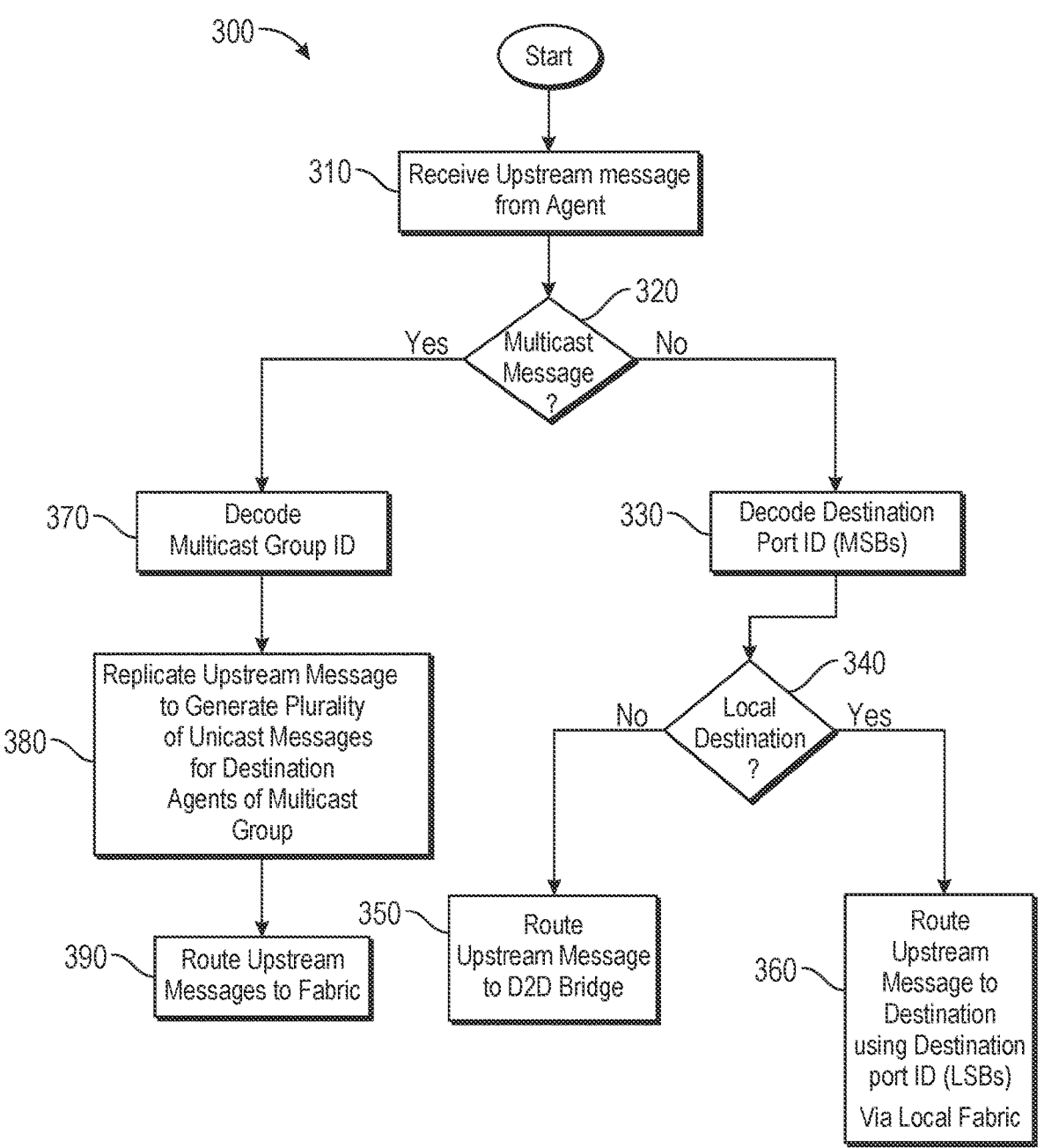
FIG. 3 is a flow diagram of a method in accordance with an embodiment.

Referring now to FIG. 3, shown is a flow diagram of a method in accordance with an embodiment. As shown in FIG. 3, method 300 is a method for handling an incoming message within a fabric adapter. As such, method 300 may be performed by hardware circuitry of the fabric adapter alone, and/or in combination with firmware and/or software. Understand that the discussion of FIG. 3 regards the operation of one fabric adapter that is associated with one agent. Similar operation may occur in other fabric adapters. Furthermore, while described in the context of a fabric adapter coupled to a single agent, in some cases multiple independent agents may be coupled to one fabric adapter, which can handle incoming messages from the coupled agents.

In any event, as shown, method 300 begins by receiving an upstream message from the agent (block 310). This message may be any type of communication such as main band signaling or sideband signaling. At diamond 320, it is determined whether the incoming message is a multicast message. If not, control passes to block 330, where a destination Port ID is decoded. More specifically, at block 320, the most significant bits (MSBs) may be decoded to identify a destination chiplet. Based on this decoded destination Port ID it is determined at diamond 340 whether the destination is a local destination (i.e., on die). If not, control passes to block 350, where the upstream message may be routed to a D2D bridge. Understand that this D2D bridge may couple via an on-package interconnect to (or on a path to) a destination chiplet.

Instead if it is determined that the destination agent is a local destination, control passes to block 360 where the upstream message may be routed to the destination agent using the least significant bits (LSBs) of the Port ID (namely, a destination agent portion of the Port ID). Such message communication may be via a local fabric to which the fabric adapter sends the upstream message. Understand that in turn the local fabric directs the message to the destination agent. While not shown in FIG. 3, in the context of a non-posted message, the fabric adapter may at a later time receive a completion for the non-posted message, which it can then provide to the originating agent.

Further referring to FIG. 3, if it is determined that the message is a multicast message, control passes to block 370, where a multicast group ID of the message can be decoded. From this decoded information, the fabric adapter may replicate upstream messages (block 380). More specifically, upstream messages may be replicated for the number of unicast messages for the destination agents of the multicast group. When all of the destination agents are on chip, the fabric adapter may replicate messages for all of the destination agents. When there are off-chip destinations, the fabric adapter may only generate a single replicated message for each dielet that has a destination agent on it, which it then passes further upstream. Thus at block 390, these generated messages are routed upstream to the fabric, which may then route them accordingly (either on chip or off-chip via one or more D2D bridges). Although shown at this high level in the embodiment of FIG. 3, many variations and alternatives are possible.

Figure 4:
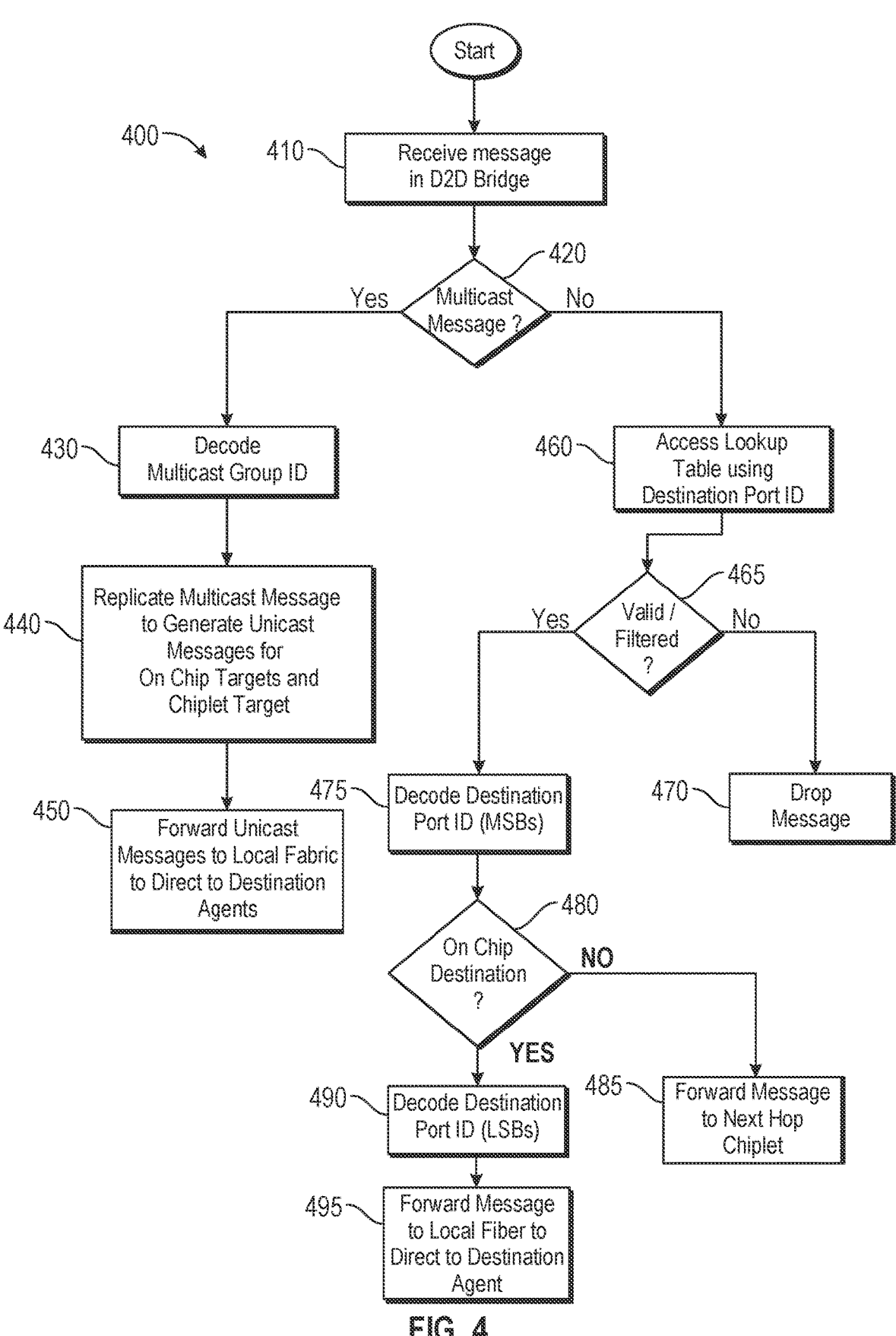
FIG. 4 is a flow diagram of a method in accordance with another embodiment.

Referring now to FIG. 4, shown is a flow diagram of a method in accordance with another embodiment. As shown in FIG. 4, method 400 is a method for handling an incoming message within a D2D bridge. As such, method 400 may be performed by hardware circuitry of the D2D bridge alone, and/or in combination with firmware and/or software.

As illustrated, method 400 begins by receiving a message in a D2D bridge (block 410). It is next determined at diamond 420 whether the received message is a multicast message. If so, control passes to block 430 where the multicast group ID of the message may be decoded. Thereafter, at block 440, from the decoded information, the D2D adapter may replicate the multicast message into a plurality of unicast messages for the destination agents of the multicast group. Then at block 450 the unicast messages may be sent to the local fabric of the chiplet to cause the fabric to direct the unicast messages to the destination agents.

Still referring to FIG. 4, if it is determined at diamond 420 that the incoming message is not a multicast message, control passes to block 460 where a lookup table may be accessed using the destination Port ID of the message. Next it is determined at diamond 465, based on this table lookup whether the message is valid or is to be filtered. If so, at block 470 the message is dropped. In the instance of a valid message, control passes to block 475 where the destination Port ID may be decoded. More specifically, the MSBs may be decoded to determine, next, at diamond 480, whether the destination of the unicast message is on chip. If not, control passes to block 485, where the message may be forwarded to a next hop chiplet that may include or be on the path to the destination agent.

Otherwise, if it is determined that the destination is on chip, control passes to block 490 where the LSBs of the destination Port ID can be decoded. Then based upon this decoding, at block 495 the message may be forwarded to the local fabric to cause it to direct the message to the destination agent. Understand while shown at this high level in the embodiment of FIG. 4, many variations and alternatives are possible.

Figure 5:
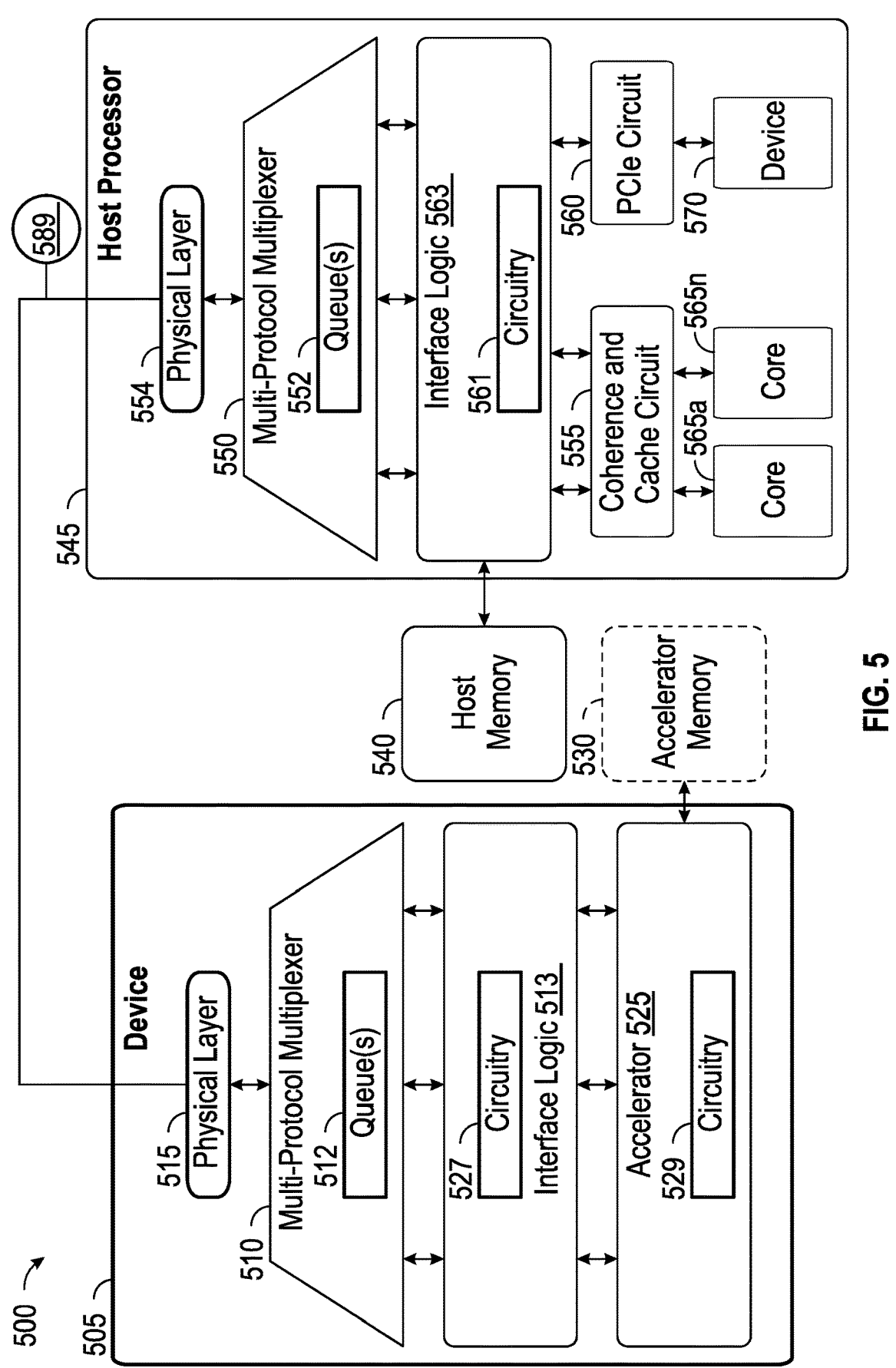
FIG. 5 is a block diagram of a system in accordance with an embodiment.

FIG. 5 is a block diagram of a system in accordance with an embodiment. As shown in FIG. 5 a device 505 may be an accelerator or processor device coupled to a host processor 545 via an interconnect 589, which may be an interconnect, bus, trace, and so forth. In various embodiments, one or more of device 505 and host processor 545 may be multi-die devices implementing intra and inter-die routing capabilities, leveraged at least in part using Port IDs as described herein. Device 505 and host processor 545 may communicate over link 589 to enable data and messages to pass therebetween. In some embodiments, link 589 may be operable to support multiple protocols and communication of data and messages via the multiple interconnect protocols, including a Compute Express Link (CXL) protocol in accordance with one or more CXL specifications. For example, link 589 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 505 may include an accelerator 525 including circuitry 529. In some instances, accelerator 525 and circuitry 529 may provide processing and memory capabilities. Examples of device 505 may include producer-consumer devices such as a graphics or other specialized accelerator, producer-consumer plus devices, software-assisted device memory devices, autonomous device memory devices, and giant cache devices. In some cases, accelerator 525 may couple to an optional accelerator memory 530. Accelerator 525 and circuitry 529 may provide the processing and memory capabilities based on the device. For example, accelerator 525 and circuitry 529 may communicate using, for example, a coherent interconnect protocol for various functions, such as coherent requests and memory flows with host processor 545 via interface logic 513 and circuitry 527.

In some embodiments, protocol queue 512 may be protocol specific such that each interconnect protocol may be associated with a particular protocol queue. Multiplexer 510 may also implement arbitration circuitry to arbitrate between communications of different protocols and provide selected communications to a physical layer 515. Note that different circuitry of device 505 may be implemented on one or more semiconductor dies that may communicate with each other using Port IDs as described herein.

In various embodiments, host processor 545 may be a main processor such as a CPU. Host processor 545 may be coupled to a host memory 540 and may include a coherence and cache circuit 555, which may include a cache hierarchy. Circuit 555 may communicate with one or more cores 565*a-n*. In some embodiments, circuit 555 may enable communication via one or more of a coherent interconnect protocol (e.g., CXL.cache) and a memory interconnect protocol (e.g., CXL.mem).

In various embodiments, host processor 540 may include a device 570 to communicate with a PCIe circuit 560 over an interconnect. In some embodiments, device 570 may be an I/O device, such as a PCIe I/O device. In other cases, one or more external devices such as PCIe devices may couple to PCIe 570. Note that different circuitry of host processor 545 may be implemented on one or more semiconductor dies that may communicate with each other using Port IDs as described herein In embodiments, host processor 545 may enable multi-protocol communication between the components of host processor 545 and device 505. To this end, as shown in FIG. 5, circuits 555 and 560 (collectively) may communicate any or all of CXL.io/PCIe, CXL.cache, and/or CXL.memory traffic with a multi-protocol multiplexer 550 having one or more protocol queues 552 to send and receive messages and data with device 505.

Protocol queue 552 may be protocol specific such that each interconnect protocol may be associated with a particular protocol queue. Multiplexer 550 may also implement arbitration circuitry to arbitrate between communications of different protocols and provide selected communications to a physical layer 554.

Figure 6:
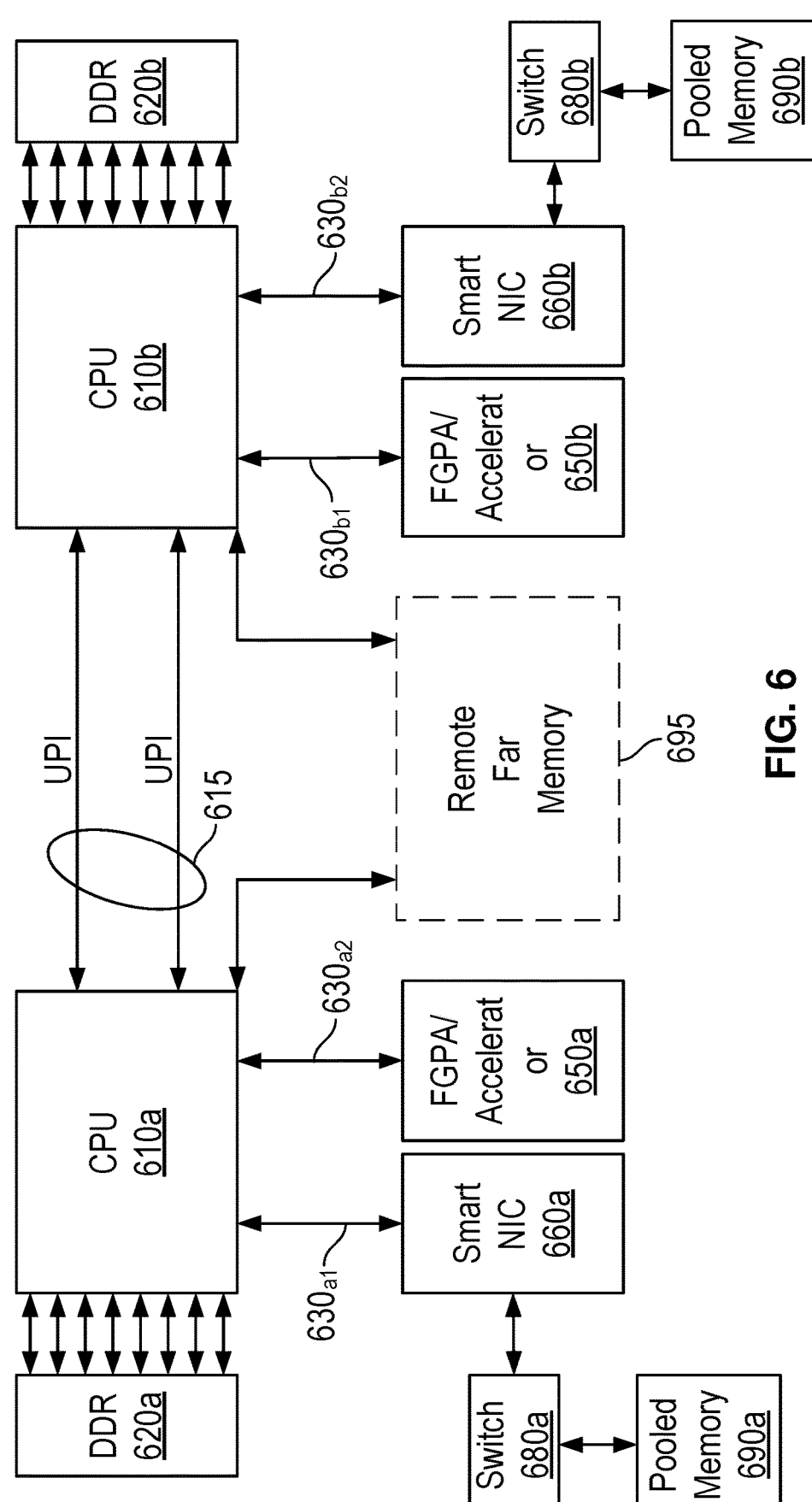
FIG. 6 is a block diagram of a system in accordance with another embodiment.

Referring now to FIG. 6, shown is a block diagram of a system in accordance with another embodiment. As shown in FIG. 6, a system 600 may be any type of computing device, and in one embodiment may be a server system such as an edge platform. In the embodiment of FIG. 6, system 600 includes multiple CPUs 610*a,b* that in turn couple to respective system memories 620*a,b* which in embodiments may be implemented as double data rate (DDR) memory. Note that CPUs 610 may couple together via an interconnect system 615 such as an Intel® Ultra Path Interconnect or other processor interconnect technology. In various embodiments, one or more of CPUs 610 may be implemented in multi-die packages having intra and inter-die routing capabilities, leveraged at least in part using Port IDs as described herein.

To enable coherent accelerator devices and/or smart adapter devices to couple to CPUs 610 by way of potentially multiple communication protocols, a plurality of interconnects 630*a1-b2* may be present. In an embodiment, each interconnect 630 may be a given instance of a CXL link.

In the embodiment shown, respective CPUs 610 couple to corresponding field programmable gate arrays (FPGAs)/accelerator devices 650*a,b*, in one embodiment. In addition CPUs 610 also couple to smart network interface circuit (NIC) devices 660*a,b*. In turn, smart NIC devices 660*a,b* couple to switches 680*a,b* that in turn couple to a pooled memory 690*a,b* such as a persistent memory. As shown information can be stored in a pooled memory 690. In turn, CPUs 610 or other entities may access and further process this information from pooled memory 690. In addition, CPUs 610 may couple to an optional remote far memory 695.

Figure 7:
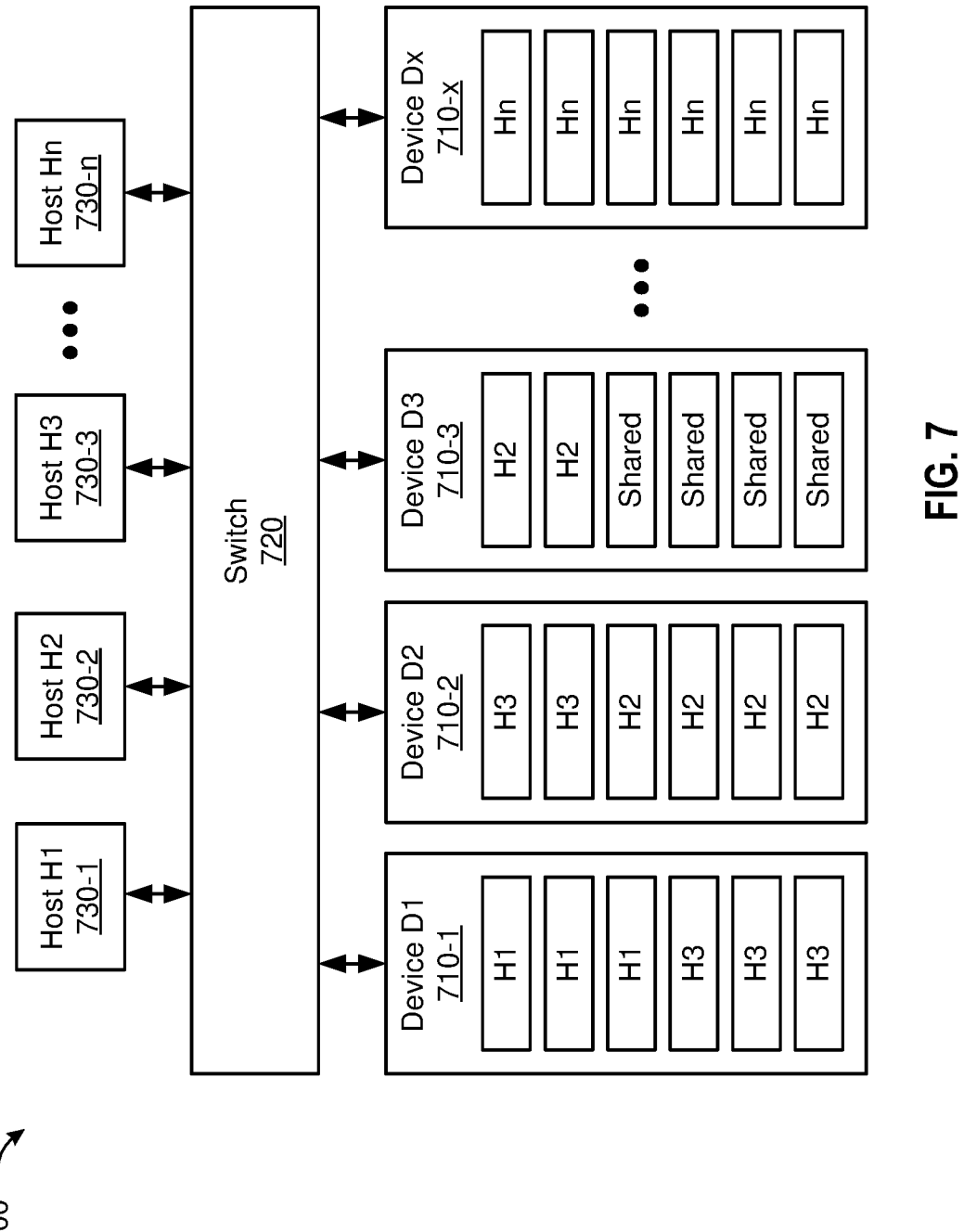
FIG. 7 is a block diagram of another example system in accordance with an embodiment.

Referring now to FIG. 7, shown is a block diagram of another example system in accordance with an embodiment. In FIG. 7, system 700 may be all or part of a rack-based server having multiple hosts in the form of compute drawers that may couple to pooled memory via one or more switches.

As shown, multiple hosts 730-1-*n* (also referred to herein as "hosts 730") are present. Each host may be implemented as a compute drawer having one or more SoCs (which may be implemented as multi-die packages using Port ID-based routing between dies within and external to the SoC), memory, storage, interface circuitry and so forth. In one or more embodiments, each host 730 may include one or more virtual hierarchies corresponding to different cache coherence domains. Hosts 730 may couple to a switch 720, which may be implemented as a CXL switch (e.g., a CXL 2.0 (or later) switch). In an embodiment, each host 730 may couple to switch 720 using an off-package interconnect, e.g., a Universal Chiplet Interconnect Express (UCIe) interconnect running a CXL protocol.

Switch 720 may couple to multiple devices 710-1-*x* (also referred to herein as "device 710"), each of which may be a memory device (e.g., a Type 3 CXL memory expansion device) and/or an accelerator. In the illustration of FIG. 7, each device 710 is shown as Type 3 memory device having any number of memory regions (e.g., defined partitions, memory ranges, etc.). Depending on configuration and use case, certain devices 710 may include memory regions assigned to particular hosts while others may include at least some memory regions designated as shared memory. Although embodiments are not limited in this regard, the memory included in devices 710 may be implemented with any type(s) of computer memory (e.g., dynamic random-access memory (DRAM), static random-access memory (SRAM), non-volatile memory (NVM), a combination of DRAM and NVM, etc.).

The following examples pertain to further embodiments.

In one example, an apparatus includes a first chiplet comprising: a plurality of agents, at least some of the plurality of agents to generate messages, each of the messages having a destination port identifier comprising a first portion to identify a destination chiplet and a second portion to identify a destination agent on the destination chiplet; a die-to die bridge to couple the first chiplet to a second chiplet; a fabric coupled to the die-to-die bridge, where the fabric is to route communications between the plurality of agents, where a first agent is to generate a first message having a first destination port identifier; and a first fabric adapter coupled to the first agent, the first fabric adapter to direct the first message to the die-to-die bridge when the first portion of the first destination port identifier identifies a second chiplet of the plurality of chiplets as the destination chiplet.

In an example, the first fabric adapter is to direct the first message to the fabric when the first portion of the first destination port identifier identifies the first chiplet as the destination chiplet, the fabric to provide the first message to a second agent of the plurality of agents, based on the second portion of the destination port identifier.

In an example, the first portion of the destination port identifier comprises a plurality of MSBs of the destination port identifier, and the second portion of the destination port identifier comprises a plurality of LSBs of the destination port identifier.

In an example, the first fabric adapter is to replicate a multicast message into a plurality of unicast messages and direct each of the replicated plurality of unicast messages towards a destination agent.

In an example, the first fabric adapter is to aggregate a plurality of completions and send an aggregated completion to the first agent, when the first message is a non-posted message.

In an example, the fabric adapter is to: receive one or more of the plurality of completions from one or more agents of the first chiplet; and receive one or more of the plurality of completions from at least one remote chiplet.

In an example, the apparatus comprises a multi-chip package having a first instantiation of the first chiplet and a second instantiation of the first chiplet, the first instantiation having a first lookup table with first mapping information and the second instantiation having a second lookup table with second mapping information different than the first mapping information.

In an example, the first mapping information and the second mapping information comprises late binding information.

In an example, the multi-chip package further comprises a second chiplet, the second chiplet having a second hardware topology, the first instantiation and the second instantiation of the first chiplet having a common hardware topology.

In an example, the D2D bridge is to abort a second message when a destination port identifier of the second message is not present in a lookup table.

In an example, the D2D bridge comprises a memory to store a lookup table having a plurality of entries, each of the plurality of entries to store a destination chiplet identifier and routing information.

In an example, the D2D bridge is to access an entry of the lookup table based at least in part on the first portion of the destination port identifier.

In an example, the lookup table is visible to a basic input output system.

In an example, the D2D bridge is to: receive a plurality of completions from at least some of the plurality of agents come on the plurality of completions in response to a message from a remote source agent; and based at least in part on the plurality of completions, send an aggregated completion towards the remote source agent.

In another example, a method comprises: receiving, in a D2D bridge of a first chiplet, a message from a second chiplet; accessing a mapping structure using a destination port identifier of message, the destination port identifier comprising a first portion to identify a destination chiplet and a second portion to identify a destination agent on the destination chiplet; and forwarding the message to another chiplet when the first portion of the destination port identifier identifies the another chiplet; and forwarding the message to a fabric of the first chiplet to cause the fabric to direct the message to a destination agent of the first chiplet when the first portion of the destination port identifier identifies the first chiplet.

In an example, the method further comprises dropping message if the destination port identifier is not present in the mapping structure.

In an example, the method further comprises: when the message is a multicast message, decoding, in the D2D bridge, a multicast group identifier of the message; and generating a plurality of unicast messages from the message.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises first and second SoCs. The first SoC comprises a multi-heterogenous chiplet package comprising a first chiplet and a second chiplet, the first chiplet comprising: a first agent and a second agent, the first and second agents to generate messages, each of the messages having a destination port identifier comprising a first portion to identify a destination chiplet and a second portion to identify a destination agent on the destination chiplet; storage to store a first routing table, the first routing table to identify, for each of a plurality of chiplets of the system, a destination chiplet and a routing action; a die-to die bridge to couple the first chiplet to the second chiplet, where the die-to-die bridge, based on the first routing table, is to send: a first message having a first destination port identifier to the second chiplet when the first portion of the first destination port identifier identifies the second chiplet as the destination chiplet; and a second message having a second destination port identifier to the second chiplet when the first portion of the second destination port identifier identifies a first chiplet of a second SoC as the destination chiplet. The second SoC comprises the first chiplet and a third chiplet, where the storage of the first chiplet of the second SoC is to store a second routing table, the second routing table different than the first routing table.

In an example, the first chiplet is heterogenous to the second chiplet.

In an example, the system further comprises another integrated circuit coupled between the first SoC and the second SoC, where a die-to-die bridge of the second chiplet of the first SoC is to send the second message to the another integrated circuit, to enable the another integrated circuit to send the second message to the second SoC.

In yet another example, an apparatus includes first chiplet means comprising: a plurality of agents, at least some of the plurality of agents to generate messages, each of the messages having a destination port identifier comprising a first portion to identify a destination chiplet means and a second portion to identify a destination agent on the destination chiplet means; die-to die bridge means for coupling the first chiplet means to a second chiplet means; fabric means coupled to the die-to-die bridge means, where the fabric means is for routing communications between the plurality of agents, where a first agent is to generate a first message having a first destination port identifier; and first fabric adapter means coupled to the first agent, the first fabric adapter means for directing the first message to the die-to-die bridge means when the first portion of the first destination port identifier identifies a second chiplet means of the plurality of chiplet means as the destination chiplet means.

In an example, the first fabric adapter means is to direct the first message to the fabric means when the first portion of the first destination port identifier identifies the first chiplet means as the destination chiplet means, the fabric means for providing the first message to a second agent of the plurality of agents, based on the second portion of the destination port identifier.

In an example, the first portion of the destination port identifier comprises a plurality of MSBs of the destination port identifier, and the second portion of the destination port identifier comprises a plurality of LSBs of the destination port identifier.

In an example, the first fabric adapter means is to replicate a multicast message into a plurality of unicast messages and direct each of the replicated plurality of unicast messages towards a destination agent.

In an example, the first fabric adapter means is to aggregate a plurality of completions and send an aggregated completion to the first agent, when the first message is a non-posted message.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a first chiplet comprising:
      a plurality of agents, at least some of the plurality of agents to generate messages, each of the messages having a destination port identifier comprising a first portion to identify a destination chiplet and a second portion to identify a destination agent on the destination chiplet;
   a die-to die bridge to couple the first chiplet to a second chiplet;
   a fabric coupled to the die-to-die bridge, wherein the fabric is to route communications between the plurality of agents, wherein a first agent is to generate a first message having a first destination port identifier; and
   a first fabric adapter coupled to the first agent, the first fabric adapter to direct the first message to the die-to-die bridge when the first portion of the first destination port identifier identifies a second chiplet of the plurality of chiplets as the destination chiplet.

2. The apparatus of claim 1, wherein the first fabric adapter is to direct the first message to the fabric when the first portion of the first destination port identifier identifies the first chiplet as the destination chiplet, the fabric to provide the first message to a second agent of the plurality of agents, based on the second portion of the destination port identifier.

3. The apparatus of claim 1, wherein the first portion of the destination port identifier comprises a plurality of most significant bits (MSBs) of the destination port identifier, and the second portion of the destination port identifier comprises a plurality of least significant bits (LSBs) of the destination port identifier.

4. The apparatus of claim 1, wherein the first fabric adapter is to replicate a multicast message into a plurality of unicast messages and direct each of the replicated plurality of unicast messages towards a destination agent.

5. The apparatus of claim 4, wherein the first fabric adapter is to aggregate a plurality of completions and send an aggregated completion to the first agent, when the first message is a non-posted message.

6. The apparatus of claim 5, wherein the fabric adapter is to:
   receive one or more of the plurality of completions from one or more agents of the first chiplet; and
   receive one or more of the plurality of completions from at least one remote chiplet.

7. The apparatus of claim 1, wherein the apparatus comprises a multi-chip package having a first instantiation of the first chiplet and a second instantiation of the first chiplet, the first instantiation having a first lookup table with first mapping information and the second instantiation having a second lookup table with second mapping information different than the first mapping information.

8. The apparatus of claim 7, wherein the first mapping information and the second mapping information comprises late binding information.

9. The apparatus of claim 7, wherein the multi-chip package further comprises a second chiplet, the second chiplet having a second hardware topology, the first instantiation and the second instantiation of the first chiplet having a common hardware topology.

10. The apparatus of claim 1, wherein the D2D bridge is to abort a second message when a destination port identifier of the second message is not present in a lookup table.

11. The apparatus of claim 1, wherein the D2D bridge comprises a memory to store a lookup table having a plurality of entries, each of the plurality of entries to store a destination chiplet identifier and routing information.

12. The apparatus of claim 11, wherein the D2D bridge is to access an entry of the lookup table based at least in part on the first portion of the destination port identifier.

13. The apparatus of claim 11, wherein the lookup table is visible to a basic input output system.

14. The apparatus of claim 1, wherein the D2D bridge is to:

receive a plurality of completions from at least some of the plurality of agents come on the plurality of completions in response to a message from a remote source agent; and based at least in part on the plurality of completions, send an aggregated completion towards the remote source agent.

15. A method comprising:

receiving, in a die-to-die (D2D) bridge of a first chiplet, a message from a second chiplet;

accessing a mapping structure using a destination port identifier of message, the destination port identifier comprising a first portion to identify a destination chiplet and a second portion to identify a destination agent on the destination chiplet; and forwarding the message to another chiplet when the first portion of the destination port identifier identifies the another chiplet; and forwarding the message to a fabric of the first chiplet to cause the fabric to direct the message to a destination agent of the first chiplet when the first portion of the destination port identifier identifies the first chiplet.

16. The method of claim 15, further comprising dropping message if the destination port identifier is not present in the mapping structure.

17. The method of claim 15, further comprising:

when the message is a multicast message, decoding, in the D2D bridge, a multicast group identifier of the message; and generating a plurality of unicast messages from the message.

18. A system comprising:

a first system on chip (SoC) comprising a multi-heterogenous chiplet package comprising a first chiplet and a second chiplet, the first chiplet comprising:

a first agent and a second agent, the first and second agents to generate messages, each of the messages having a destination port identifier comprising a first portion to identify a destination chiplet and a second portion to identify a destination agent on the destination chiplet;

storage to store a first routing table, the first routing table to identify, for each of a plurality of chiplets of the system, a destination chiplet and a routing action;

a die-to die bridge to couple the first chiplet to the second chiplet, wherein the die-to-die bridge, based on the first routing table, is to send:

a first message having a first destination port identifier to the second chiplet when the first portion of the first destination port identifier identifies the second chiplet as the destination chiplet; and a second message having a second destination port identifier to the second chiplet when the first portion of the second destination port identifier identifies a first chiplet of a second SoC as the destination chiplet; and the second SoC coupled to the first SoC, the second SoC comprising the first chiplet and a third chiplet, wherein the storage of the first chiplet of the second SoC is to store a second routing table, the second routing table different than the first routing table.

19. The system of claim 18, wherein the first chiplet is heterogenous to the second chiplet.

20. The system of claim 18, further comprising another integrated circuit coupled between the first SoC and the second SoC, wherein a die-to-die bridge of the second chiplet of the first SoC is to send the second message to the another integrated circuit, to enable the another integrated circuit to send the second message to the second SoC.

* * * * *